Feb. 19, 1963 A. C. ROSE 3,078,443

COMPOUND ERROR CORRECTION SYSTEM

Filed Jan. 22, 1959 4 Sheets-Sheet 1

INVENTOR.
ALAN C. ROSE

BY

INVENTOR.
ALAN C. ROSE

BY

INVENTOR.
ALAN C. ROSE

BY

INVENTOR.
ALAN C. ROSE

BY 3,078,443
Patented Feb. 19, 1963

3,078,443

COMPOUND ERROR CORRECTION SYSTEM

Alan C. Rose, Summit, N.J.
(5030 Calvin Ave., Tarzana, Calif.)

Filed Jan. 22, 1959, Ser. No. 788,453
17 Claims. (Cl. 340—146.1)

This invention relates to error detection and correction systems for digital data handling systems.

The simplest form of digital error detection involves the transmission of each digit twice. If the two signals are different at the detecting point, it is evident that an error has occurred. The simplest form of error correction system involves the transmission of each digital signal three times. Errors may then be corrected on a two-out-of-three basis.

In the field of digital data transmission, more sophisticated arrangements for detecting or correcting errors are also well known. These systems vary in the amount of redundancy which is required. Thus, for example, a simple parity check circuit for error detection merely involves the addition of an extra binary digit or "bit" to groups of digits to indicate whether the number of "1's" included in the group is odd or even. More specifically, the four digit code group 1011 would have a fifth parity bit added to produce the code group 10111 which includes an even number of "1's." The parity of each complete group of digits including the check bit is reviewed at the data receiving point, and errors are indicated by a change in parity.

For error correction purposes several parity checks may be made over different sets of digits included in the message to be transmitted. Each information digit is included in two check groups. The position of an erroneous digit may then be located by the erroneous parity check groups. Such a system including four information digits and three check digits is disclosed in R. W. Hamming and E. W. Holbrook Reissue Patent No. 23,601, granted December 23, 1952.

Errors may also be corrected by systems in which digits are arranged in a matrix and parity checks are formed for the rows and columns. After transmission the digits may be regrouped in matrix, and errors identified by the row and column parity check failures. One system of this general type is disclosed in E. P. G. Wright, Patent No. 2,653,996, granted September 29, 1953.

It has also been discovered in the last year or two that errors in many system tend to be grouped. More particularly, if there is, for example, a probability of 1 in 100,000 that a given bit will be changed in transmission, the probability that the next bit will also be wrong may drop to 1 in 10. The adverse effects of groups of errors may be reduced (1) by providing for multiple error correction through increasing redundancy or (2) by interleaving the digits of several code groups so that adjacent erroneous digits will be part of different code groups. The individual code groups may be the type disclosed in the R. W. Hamming et al. patent cited above. This interleaved or interlaced Hamming code and several other coding systems are described in some detail in an article entitled "Evaluation of Some Error Correction Methods Applicable to Digital Data Transmission" by A. B. Brown and S. T. Meyers pp. 37 through 55 of Part 4 of the 1958 IRE National Convention Record. This article also considers "error detection plus rerun" systems in which code groups are repeated upon the detection of an individual error. In passing, it is noted that no determination of error rates is made in this last mentioned type of system.

From the foregoing discussion, it is clear that there are many error detection and error correction schemes available to the engineer. A review of the various codes, however, reveals the following dilemma. First, the codes which have moderately good error correcting potentials usually have high redundancies. In this regard, proposals to add a number of check bits equad to the number of information bits are not uncommon. This reduces the channel capacity by one-half, however, and this is normally not acceptable.

Accordingly, the principal object of the present invention is to detect and correct errors in digital signals without wasting channel space by unnecessary redundancy.

In accordance with one aspect of the present invention this object is accomplished by sensing the error detection or correction rates of the system and switching between schemes which have different error detection or correction capabilities. Thus for specific example a high grade data channel could normally be provided with a simple parity checking error detection scheme in which every sixteenth bit would be a check bit. At the detector a counter would detect the number of parity check failures occurring within a given time period. Whenever the error rate exceeds a predetermined toleration level, the channel would be switched over to a low redundancy error correction system. In such a system one bit in four or so could be a check bit, and errors may be corrected satisfactorily as long as they do not occur too close together. If conditions become progressively worse, possibly as a result of sunspot activity or an electrical storm, for example, the channel could be switched over to an interlaced error correcting system or another more powerful form of error correcting arrangement. These progressive shifts would normally require additional channel space, but the redundancy would only be that which is actually required to keep the errors within bounds.

In switching from one error correction scheme to another it is useful to determine the rate at which errors are being corrected and also the rate of occurrence of uncorrectable errors or error patterns. Normally, the signals used in correcting errors are readily available, and these signals may be routed to a first error counter. This first counter may have its output periodically sensed and then be reset to give an error rate indication. The more sophisticated error correction systems also include arrangements for indicating the occurrence of error patterns which are beyond the correction capabilities of the system. In accordance with one aspect of the present invention the rate of correctable errors and the rate of occurrence of uncorrectable errors or error bursts are determined and this information is utilized to increase or decrease the redundancy and the error correction capabilities of the digital information channel.

In accordance with one feature of the invention a digital data handling system is provided with compound encoding and decoding circuitry including means for providing error detection and correction schemes of different redundancies or of different error handling capacities, and switching circuitry is provided for switching said compound encoding and decoding circuits from one error detection and correction scheme to another.

In accordance with another feature of the invention the system as set forth in the preceding paragraph is provided with one or more circuits for determining the rate of occurrence of errors, and the switching circuits are controlled to hold the errors in the decoded data within tolerable limits. The rate circuits may be implemented by individual counters which count the correctable and uncorrectable errors, and which are periodically sensed and reset.

Other objects and features, and various advantages of the invention will become apparent from a consideration of the following detailed description and from the drawings, in which.

Figure 1:
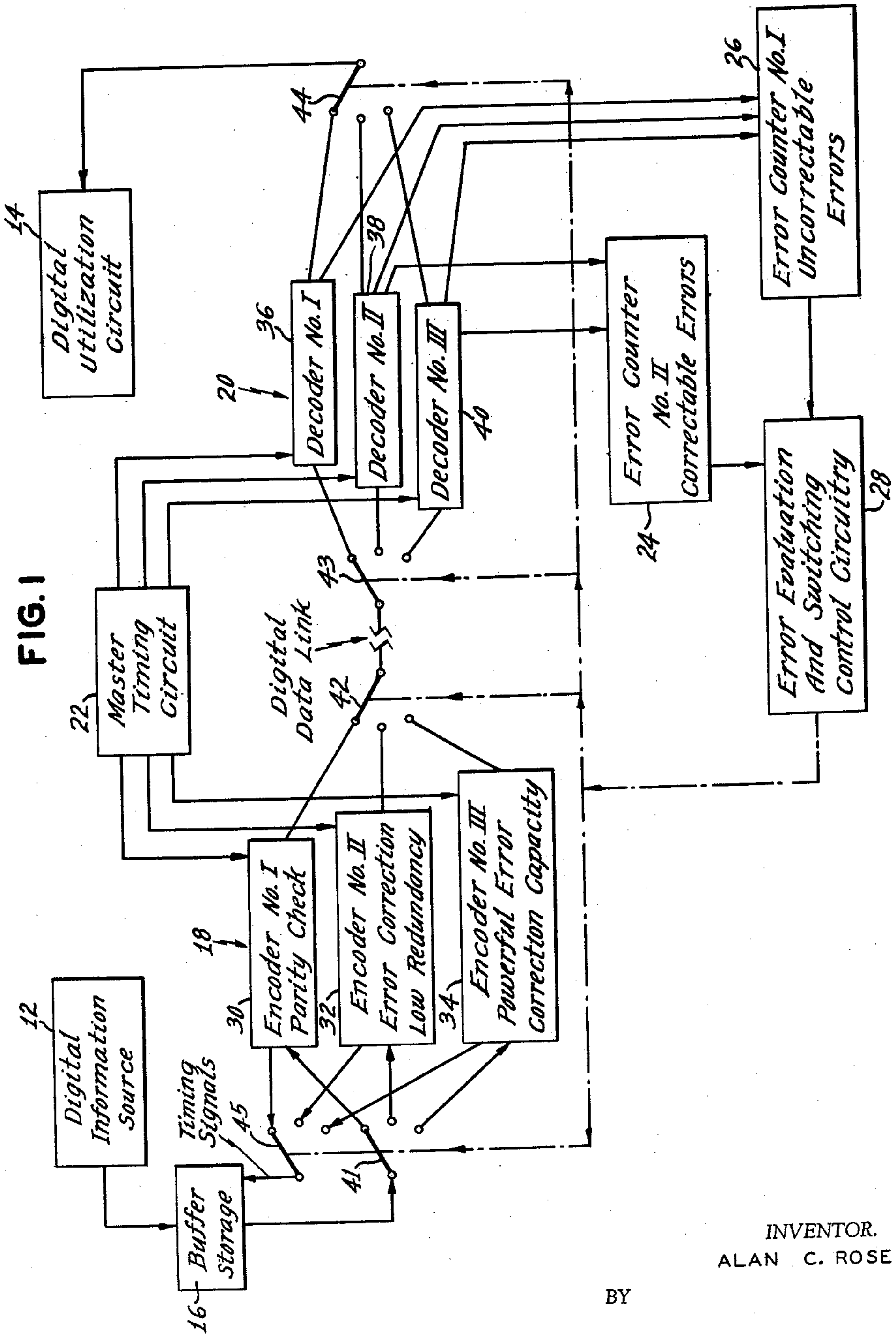
FIGURE 1 is a block diagram of a digital transmission system in accordance with the present invention.

With reference to the drawings, the overall block diagram of one representative system in accordance with present invention includes a digital signal information source 12, and a digital utilization circuit 14. Between the source and utilization circuit are included a buffer storage circuit 16, a compound encoding circuit 18, a compound decoding circuit 20, and several special control circuits. These special control circuits include the master source of timing signals 22, the two error counters 24 and 26 for determining error rates, and the error evaluation and switching control circuit 28. Although the counters 24 and 26 and the evaluation and control circuit 28 are shown as separate blocks in FIGURE 1, some of the evaluation circuits are closely tied in with the counter output circuits, as developed below.

The illustrative circuit of FIGURE 1 is shown provided with three or more encoders 30, 32 and 34, and decoders 36, 38 and 40 corresponding respectively to the three encoders. While only three sets of encoders and decoders are shown in FIGURE 1, it is to be understood that a greater number of encoding and decoding schemes may be employed.

In switching from one encoder scheme to another, a number of switches are required. These switches 41 through 45 serve to couple the information source, the data link, and the digital utilization circuit to the appropriate encoding and decoding circuits. In addition, the switch 45 supplies signals which correlate the buffer storage timing with the internal timing of the various encoders 30, 32 or 34. The switches 41 through 45 are operated in synchronism by the switching control circuit 28. Under any given set of operating conditions the switching control circuit 28 will set the switches 41 through 45 to select an encoding and decoding scheme to provide adequate error control. When error conditions change, the changes in error rates are detected by circuits 24 and 26. After a correlation of the change in error rate by circuit 28, the switches 41 through 45 may be shifted to increase or decrease the error correction capacity of the system. Thus, for example, with an intermediate error rate, the coding scheme represented by the encoder 32 and the decoder 38 may be connected to the information source 12, the data link, and to the digital utilization circuit 14. If the rate of errors decreases, however, it may be possible to use the simpler error checking circuit including the encoder 30 and the decoder 36. As noted in block 30, the simplest scheme may merely include a parity check and may not provide any error correction whatsoever. As error rates build up, however, a shift would be made under the control of circuit 28 to the encoding scheme represented by encoder 32 and decoder 38. A further increase in the error rate could result in shifting to a more powerful error correcting scheme as represented by encoder 34 and decoder 40. Such an encoder could involve digital blocks of significant length and a redundancy of 50% or more, by way of example.

Figure 2:
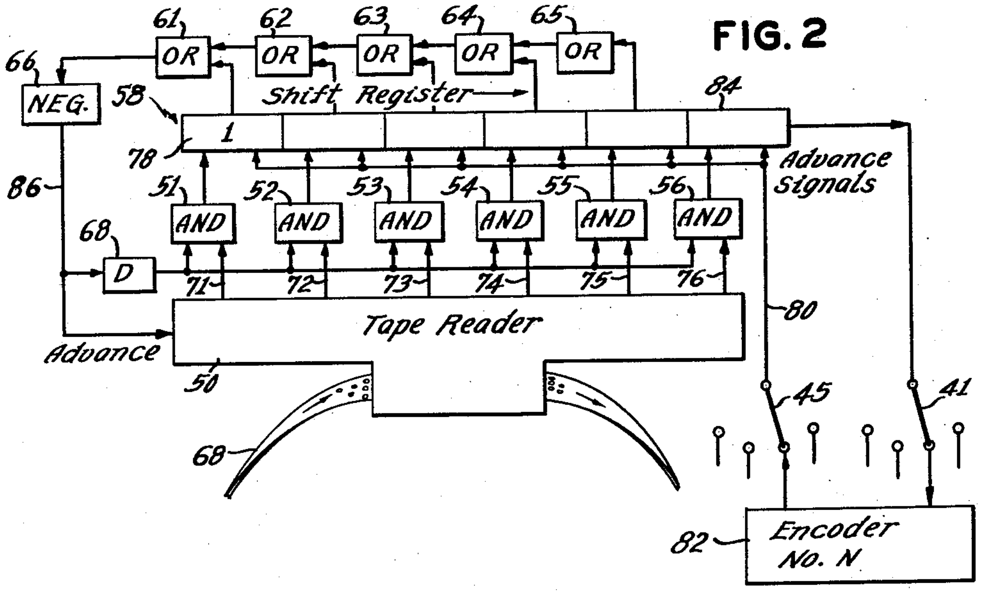
FIGURE 2 illustrates one buffer storage circuit which may be employed with the system of FIGURE 1.

FIGURE 2 is a detailed block circuit diagram of a buffer storage unit which may be employed in accordance with the present invention. The buffer storage circuit shown in FIGURE 2 is only one of a number of such circuits which could be employed in the implementation of the circuit of FIGURE 1. The circuit of FIGURE 2 includes a tape reader 50, a series of AND gates 51 through 56, a shift register 58, a series of five OR gates 61 through 65, a negation circuit 66 and a delay circuit 68. A tape 68 is shown being fed through the tape reader 50. For the purposes of the present example, it is assumed that five binary digits of information are provided at the output of the tape reader 50 each time the reader is advanced. Such signals are provided by standard punched paper tape having a possibility of five transverse holes. The output leads 71 through 76 from the tape reader 50 provide information signals on leads 72 through 76 which represent the binary signals read from the tape. Lead 71, however, is always energized when signals are read out of tape reader 50 to provide a "1" in the initial stage 78 of the shift register 58.

The purpose of the marker bit in the first stage of shift register 58 will now be explained. Initially, it may be noted that advance signals are applied on lead 80 to each stage of the shift register 58. These signals must, of couse, be supplied from the encoder, as the rate of advance of the signals varies in accordance with the redundancy of the particular encoding scheme which is employed. Now, as the shift register 58 is emptied by the transmission of information through the switch 41 to the encoder designated 82 in FIGURE 2, the "1" which was initially in register stage 78 is advanced to the right. It ultimately appears in shift register stage 84. At this time the remaining stages of the shift register are empty, or have "0's" stored in them.

The logic circuit including the OR circuits 61 through 65 and the negation circuit 66 is designed to sense the presence of five 0's in the first five stages of the shift register 58, and to provide a signal on lead 86 which this situation occurs. A negation circuit produces an output pulse when no input pulse is applied to it, and produces no output signal when an input pulse or "1" is supplied to it. Now, with the "1" initially located in shift register stage 78, one of the five OR circuits 61 through 65 is energized as the code group is read out of register 58, and produces a pulse at the input to the negation circuit 66. Accordingly, no output signal can appear on lead 86. When the "1" reaches stage 84 of the shift register 58, however, the input signals to all of the OR circuits 61 through 65 are "0's", and the negation circuit 66 therefore produces an output signal on lead 86. This serves to advance the tape reader 50 and to supply a new set of binary digits to the leads 72 through 76. Following a brief delay provided by the delay circuit 68, gating signals are applied to the AND circuits 51 through 56. The new group of five binary digits and the marker "1" are then entered into the shift register 58. It is to be understood that the advance of the tape reader 50 and the feeding of the new data into the shift register 58 occurs during a fraction of a shift interval so that there is no delay in the transmission of digital information to the encoder 82. It may also be noted that the marker "1" initially stored in shift register stage 78 is cleared from shift register stage 84 by the transmission of new information from the tape reader 50 through the AND circuit 56 to the shift register stage 84. Accordingly, the marker bit is not transmitted on to the encoder 82.

Figure 3:
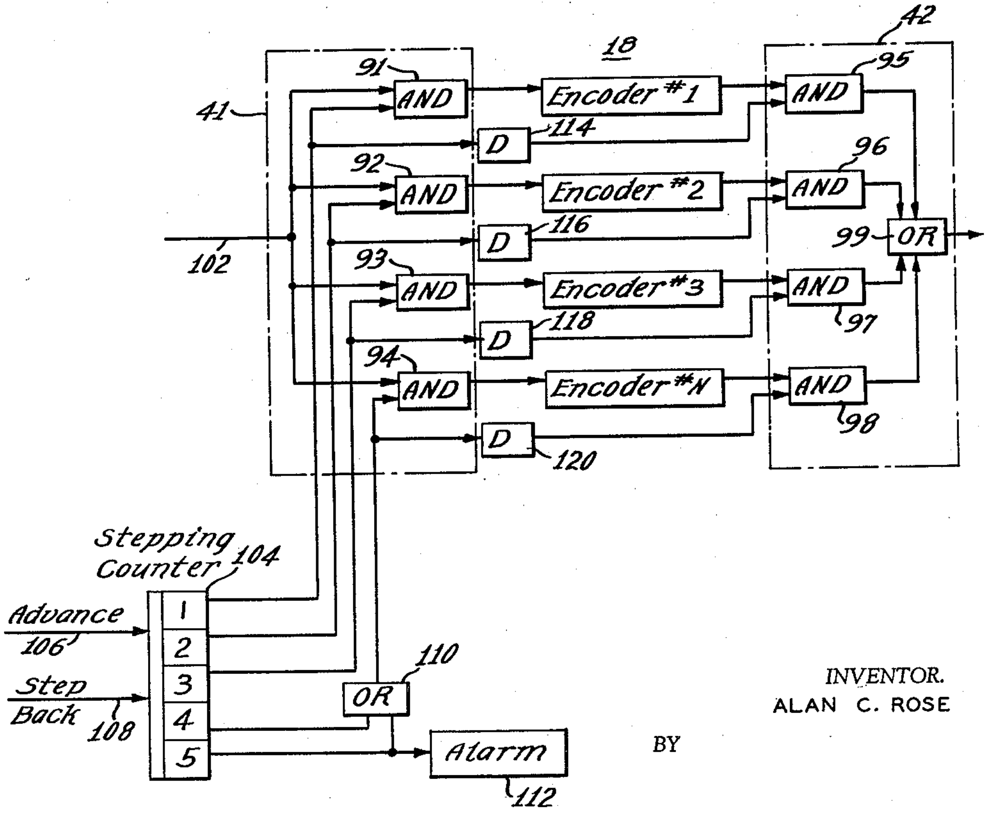
FIGURE 3 shows a circuit diagram of a switching control circuit which may be used in the system of FIGURE 1.

The circuit of FIGURE 3 represents a portion of the error evaluation and switching control circuit 28 of FIGURE 1. In addition, it shows schematically the tie-in between the circuit 28 and the switches 41 through 45 of FIGURE 1. Thus, in FIGURE 3 the switches 41 and 42 each include a series of AND gates. More particularly, the switching circuit 41 includes the AND gates 91 through 94 and the switching circuit 42 includes the AND gates 95 through 98 and the OR circuit 99. The signals from the buffer storage circuit of FIGURE 1 are applied on lead 102 to all of the AND gates 91 through 94 in parallel. The enabling input to one of the AND circuits 91 through 94 is supplied by the stepping counter 104. One and only one of the AND circuits 91 through 94 is enabled by signals from the output of one of the stages of the stepping counter 104.

The state of the stepping counter 104 is determined by signals applied to the advance lead 106 and to the "step back" lead 108 at the input to the stepping counter 104. Thus, for example, it is initially assumed that the stepping counter is in state 1. Under these conditions, the AND circuits 91 and 95 are enabled, thus selecting encoder number 1. Now, assuming that error conditions get somewhat worse, an advance pulse is applied to stepping counter 104 on lead 106. Upon the occurrence of this advance pulse, the counter 104 shifts from its first state to its second state. Under these circumstances, the AND circuits 92 and 96 are enabled, selecting encoder number 2. Encoder number 2 has more error correction capabilities than the first encoder and therefore can cope with the worsened error conditions. The application of additional advance signals on lead 106 will step the counter 104 progressively to states 3, 4 or 5. Each advance step applied to lead 106 indicates that the error rate was not tolerable under the error conditions and using the encoding and decoding circuit which was connected at the time the pulse was received on the advance lead 106. In the example shown in FIGURE 3, four encoders of progressively increasing error correction capacity are provided. Now, when the error correction capacity of the fourth encoder is exceeded, the stepping counter reaches state 5. Under these conditions, the fourth or "*nth*" encoder is maintained energized through the OR circuit 110. In addition, however, the alarm circuit 112 is energized to indicate that the error rate is above the toleration level for the entire system.

The delay circuits 114, 116, 118 and 120 are provided to indicate the padding delay necessary in the course of switching from one error correction scheme to another. Thus, the encoder circuitry associated with each scheme will have a number of digit periods of delay from input to output. A delay such as that indicated by the delay units 114, 116 118 or 120 is required in order to avoid eliminating information digits in the course of shifting from one encoding scheme to the next. For ease in accommodating such switching, it would be desirable that each of the encoders include the same number of digit periods of delay. This may be accomplished by adding a series delay circuit within each of the encoders to make the total delay provided by each encoder identical.

Figures 4, 5:
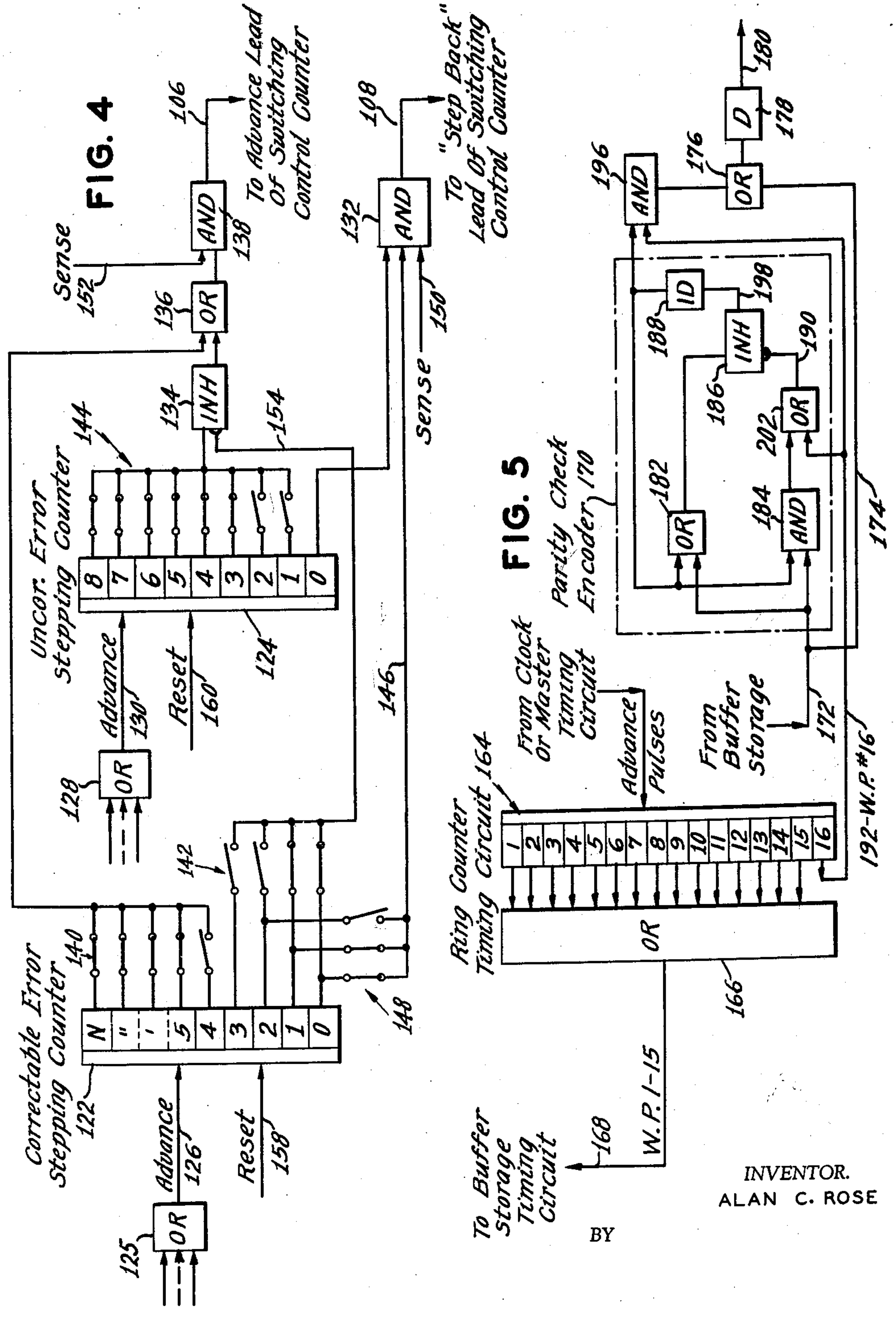
FIGURE 4 is a logic circuit diagram of the error counters and associated circuits of FIGURE 1.
FIGURE 5 shows a simple parity check encoding circuits.

FIGURE 4 shows the two error counters 122 and 124. Correctable erreors are received at the OR circuit 125 and applied to the advance lead 126 at the input to the error counter 122. Signals indicating errors which are beyond the capacity of the error correcting scheme which is currently being employed are applied to the OR circuit 128, and from this OR circuit to the advance lead 130 of the counter 124. The error evaluation circuits associated with the counters 122 and 124 include the AND circuit 132, the inhibit circuit 134, the OR circuit 136, and the AND circuit 138. Input signals to the error evaluation circuitry are supplied from switching networks 140 and 142 at the output of the error counter 122, and from switching network 144 at the output of error counter 124. In addition, signals from the "0" state of error counter 124 are supplied as one of the controlling inputs to the AND circuit 132. A second input lead 146 to the AND circuit 132 is enabled by the switching circuit 148. It is apparent, therefore, that the AND circuit 132 is controlled by signals from the "0" state of the counter 124 and from the first few stages of counter 122. Thus, if there are no uncorrectable errors, and only a very few correctable errors in a given time interval, the AND circuit 132 is enabled at the time of occurrence of a sense pulse on lead 150. Following the occurrence of a sense pulse on lead 150, if both of the other two input leads to the AND circuit 132 have been energized, a pulse will be supplied on lead 108 to step the switching control counter 104 of FIGURE 3 back one state.

In the case of the advancing of the control counter 104 of FIGURE 3, a signal is applied to the AND circuit 138 from the OR circuit 136. This occurs when the correctable error counter 122 is in one of its higher states or when the uncorrectable error counter 124 is in one of a predetermined number of its higher states. Thus, for specific example, with reference to FIGURE 4, if the counter 122 is in state 5 or a higher state, or if the error counter 124 is in state 3 or any higher state, upon the occurrence of a sense signal applied on lead 152, an advance pulse is applied to lead 106. This means that if the rate of occurrence of correctable errors, or if the number of uncorrectable errors exceeds a predetermined minimum level in a time interval determined by the rate of occurrence of sense and reset pulses, the system will be stepped to the next more powerful type of error correcting scheme.

The lead 154 to the inhibiting input terminal of inhibit unit 134 is connected to receive signals from the switching circuit 142 associated with counter 122. This arrangement is intended to handle the situation where occasional infrequent bursts of noise completely obliterate a portion of the incoming message. Under these circumstances, the correctable error stepping counter will remain in one of its lowermost states. However, the uncorrectable error stepping counter may reach state 3 or 4, for example. Under these conditions, it is not worthwhile to step to the next higher or more powerful error correcting scheme. Accordingly, an inhibiting signal applied on lead 154 prevents the application of an output pulse through the AND circuit 138 to the output lead 106.

Immediately following the application of sense signals to the leads 150 and 152, reset signals are applied to leads 158 and 160. The time interval between successive sets of sense and reset pulses is determined by the master timing circuit 22. This time interval could, for example, be a matter of one or more hundreds of digit periods of the message transmitted on the data link. Suitable time intervals may readily be determined by one skilled in the art by the error characteristics of the data link. Thus, for example, in cases where the data link is subject to rapid fluctuations in the error rate, relatively short time intervals between successive sets of sense and reset pulses would be required. On the other hand, where the rate of change of the error rate is relatively low, correspondingly longer time intervals between the pairs of sense and reset pulses are permissable. In general, however, relatively short intervals are to be preferred in order to minimize the necessary equipment in the required control circuits.

The circuit of FIGURE 5 is a simple parity check circuit which could be employed, for example, as the encoder 30 shown in FIGURE 1. The circuit of FIGURE 5 is an "even" parity check encoder circuit; that is, it provides a parity check pulse if the number of information check pulses is odd, and thus makes the total number of pulses in a given "word" or code group even. In a circuit of FIGURE 5, 15 information bits or binary digits are transmitted, and this group of fifteen bits is followed by a single parity check bit. Such a group of standard length code groups is known as a "word" in digital computer terminology. The timing for the parity check encoder of FIGURE 5 is provided by the ring counter 164. This ring counter 164 has sixteen states. The first fifteen states are connected to the inputs of the OR circuit 166. Output signals from the OR circuit 166 are applied on leads 168 through the switch 45 of FIGURE 1 to the buffer storage circuit 16. The determination of the odd or even character of the fifteen input binary digits is made by the single stage counter circuit 170. Input information digits are supplied to the circuit 170 on lead 172 from the buffer store. In addition to being applied to the counter circuit 170, the information digits are transmitted on lead 174 to the OR circuit 176. After passing through a suitable padding delay circuit 178, they are transmitted to the data link on lead 180.

The single stage counter circuit 170 includes the OR circuits 182 and 202, the AND circuit 184, the inhibit circuit 186, and the single digit period delay circuit 188. The designation "1D" in the delay circuit 188 indicates that it includes one digit period of delay. The other circuit components are assumed to operate instantaneously. The counter circuit is of the dynamic type and includes a delay loop through which a pulse may circulate. The state of the counter is determined by the presence or absence of a pulse in the loop including the circuit components 182, 186 and 188. An initial pulse from lead 172 is inserted into the delay loop by the OR circuit 182. If there is a pulse circulating in the delay loop, the application of an additional pulse on lead 172 eliminates the pulse from the delay loop. Thus, for example, the pulse circulating through the delay loop will appear as one input to the AND circuit 184. The new pulse applied on lead 172 provides the other enabling input to the AND circuit 184. Under these circumstances, an inhibiting signal is applied on lead 190 to the inhibiting input terminal of the inhibit circuit 186. This has the effect of blocking the signal which would otherwise be transmitted from the OR circuit 182 through the inhibit unit 186. The next subsequent input pulse on lead 172 is, of course, transmitted through OR circuit 182 and starts circulating in the delay loop.

Upon the stepping of the counter 164 to its sixteenth state, a signal is applied on lead 192 to the enabling input to AND circuit 196. The pulse is designated "W.P. No. 16," as it is a "word pulse" which occurs in the sixteenth digit period of each "word." This gates the pulse circulating in the memory loop of counter 170 out to the OR circuit 176, if the counter is in the odd state. However, if the counter is in the even state, and no pulse is circulating in the delay loop, the output lead 198 is not energized in the fifteenth digit period, and no signal is applied from the output of delay circuit 188 to an input of AND circuit 196 in the sixteenth digit period. Accordingly, no pulse is transmitted to the OR circuit 176 or to the output lead 180. This confirms the even nature of the parity check signals, as it has been shown that an additional pulse is added only when the counter is in the odd state.

The number 16 word pulse is also applied through the OR circuit 202 to the inhibiting input terminal of the inhibit unit 186. This serves to eliminate circulating pulses from the delay loop and reset the counter circuit to its initial state.

As mentioned above, the buffer storage timing circuit is not enabled during the sixteenth digit period of each word. Accordingly, no input signal is recevied on lead 172 at this time, and the parity check bit is combined in OR circuit 176 with the first fifteen digits of the binary word to make a complete sixteen bit word which always includes an even number of digits. It may be noted that odd parity may readily be employed instead of even parity, and is often preferred so that every word includes at least one bit. The circuit of FIGURE 5 may readily be transformed into an odd parity check circuit by the addition of a negation circuit at the input to the AND circuit 196 from the delay circuit 188.

Figure 6:
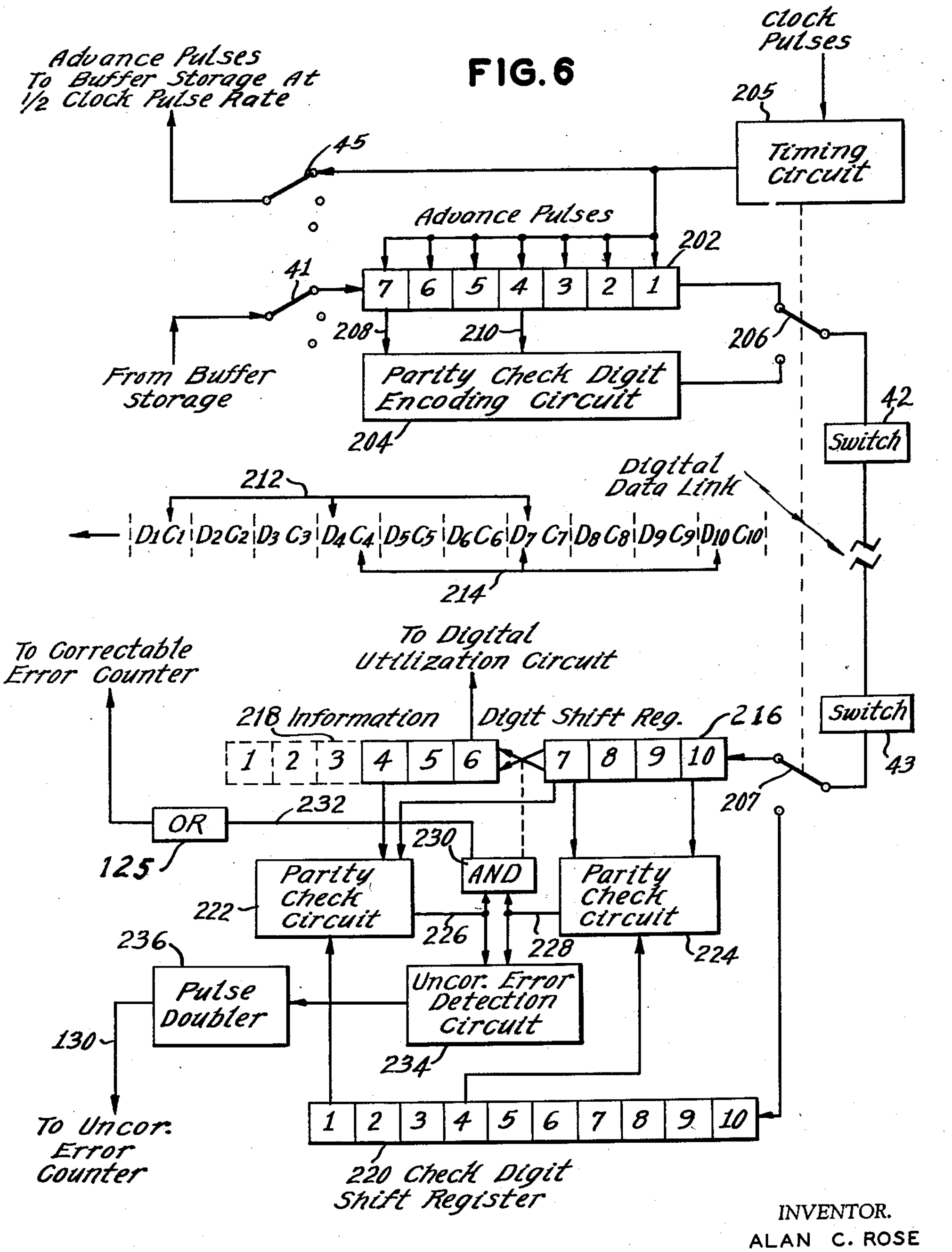
FIGURE 6 shows a known error correcting circuit, and associated circuits for tying in with the system of FIGURE 1.

The circuit of FIGURE 6 is more fully disclosed in D. W. Hagelbarger application Serial No. 732,385, filed May 1, 1958, and entitled "Continuous Digital Error Correction System," now Patent No. 2,956,124, granted October 11, 1960. The circuit of FIGURE 6 is that shown in the Hagelbarger application modified to facilitate inclusion in the system of FIGURE 1 of the present application. In the circuit of FIGURE 6, the encoder, in the upper portion of the FIGURE, includes the encoding shift register 202, and its associated parity check encoding circuit 204. Information digits are supplied from the buffer storage circuit through the switch 41 to the shift register 202. Timing signals are supplied from the timing circuit 205 through the switch 45 to the buffer storage circuit. The encoding circuit of FIGURE 6 has a redundancy of fifty percent, that is one information bit is transmitted for each check bit. The interleaving of information bits from the shift register 202 with check bits from the parity check circuit 204 is accomplished by the switch 206 which is operated under the control of the timing circuit 205. It may also be noted that the switch 207 which sorts out information and check bits at the decoder is operated in synchronism with the switch 206.

Correction of erroneous signals is possible at the decoder through the inclusion of each information digit into two check groups. Each of these check groups includes two information digits and one check digit. Thus, for example, the information digits in shift register positons 7 and 4 of shift register 202 are sampled on leads 208 and 210, and an appropriate output parity bit from circuit 204 is supplied to the switch 206. The value of the parity signal depends on the parity of the signals received on leads 208 and 210. Two parity check groups, each of which include a common information digit, are shown at 212 and 214 in diagrammatic form and associated with the digital data link. The first check group, as represented by the line 212 and its depending arrows, includes the digits $C_1$, $D_4$, and $D_7$. The second check group, as represented by the line 214 and its associated arrows, includes the check digit $C_4$, and the information digits $D_7$ and $D_{10}$. In this regard, it may be noted that the information digit $D_7$ is common to these two check groups. Now, at the receiver, the simultaneous occurrence of failures in two parity check groups which are monitored in accordance with the arrows associated with lines 212 and 214, would indicate that the information digit $D_7$ is in error. It would accordingly be reversed in the manner described below.

The decoder circuit includes an information digit shift register having a first portion 216 and a second portion 218, a check digit shift register 220, a first parity check circuit 222, and a second parity check circuit 224. The check circuit 222 checks the validity of a check group corresponding to that designated by line 212, while the second circuit 224 checks the parity of the group of digits corresponding to the line 214. Failure indications from the parity check circuits 222 and 224 are indicated on leads 226 and 228, respectively. The AND circuit 230 is operative to reverse the digit stored in stage 7 of shift register 216 as it is transferred to shift register position 6, when both input leads from the two parity check circuits 222 and 224 are energized. In addition, a signal is applied to lead 232 to be transmitted to OR circuit 125 of FIGURE 4 upon the occurrence of a correctable error.

Signals from the parity check circuits 222 and 224 are also applied to the uncorrectable error detection circuit 234. The uncorrectable error detection circuit 234 may take the form as shown in the application of D. W. Hagelbarger noted above. While the error detection 234 may be relatively complex, it may also be implemented by relatively simple counter circuits. Thus, for example, in the case of an error indication from parity check circuit 224 which is not followed by an error signal from parity check circuit 222 after exactly three digit periods, this is a prima facie indication that an error has occurred. In view of the fact that uncorrectable error indication from the circuit 234 normally indicates that at least two digits have been received erroneously, the pulse doubler 236 is provided. With this arrangement, advance signals to the stepping counter 124 of FIGURE 4 will represent to a closer approximation the actual number of erroneous digits which have been received and not properly corrected by the decoder. It is again noted that further details of the circuit of FIGURE 6 and related scheme which may be used in the implementation of the present invention are set forth in the application of D. W. Hagelbarger cited above.

With reference to FIGURE 1, it is noted that the compound encoder 18 is merely intended to represent the presence of a number of different encoding schemes of various error correcting capacities and/or redundancies. Similarly, of course, the compound decoder 20 merely represents the use of various corresponding decoding schemes. The number of encoding and decoding schemes may vary from two to as large a number as is desired or required by the data link which is being employed. It may also be noted that the encoders and decoders have been shown as being relatively independent; however, timing circuits are shown used in common, and the error correcting and error evaluation circuits are also shown as being employed jointly. It is also contemplated that many of the components employed in the encoders 30, 32, and 34 and in the decoders 36, 38, and 40 may be used in common, with switching circuits being provided to switch the needed component from one error correcting scheme to the next.

The timing circuit 22 of FIGURE 1 may include a master timing or clock source of pulses and circuitry for deriving desired control or program pulses at submultiples of the clock frequency. Techniques for obtaining program or timing control pulses are now well known in the digital data handling art. The timing circuit 22 may, for example, include a fast ring counter of the type shown at 164 in FIGURE 5 of the drawings, and a slow ring counter which is advanced by one state each time the fast ring counter completes a cycle of operation. By coupling an AND circuit to the outputs of predetermined stages of both counters, a digit pulse may be obtained in any desired digit period in the complete timing cycle of the timing circuit.

The error detection schemes described above generally involve the addition of check digits to information digits. The principles of the present invention are also applicable to coding schemes in which input digital signals are translated in a manner such that they do not appear directly in the redundant signals applied to the data link. One technique for implementing such a system could involve the inclusion of a translation matrix in the buffer storage circuit of FIGURE 2 between the leads 71 through 76 and the AND gates 51 through 56. When employed in accordance with the present invention, individual translation matrices providing different redundancies would be switched into the buffer storage circuit, and no separate encoding circuit would be required. In each case, code groups suffixed with a marker bit would be inserted in the buffer circuit shift register at its output end.

In the illustrative system shown in the drawings, the error rate signals are determined directly. Error rate signals could also be derived from the measurement of a quantity having a known relationship to the actual error rate. Thus, for example, in some systems sunspot activity bears a known relationship to the error rate. In other systems, electrical storms, the distance between stations, and other factors have a close relationship to the error rate. The term "error rate signals" as employed in the present specifications and claims includes these various parameters having a known relationship to the actual error rate.

The data link of FIGURE 1 may be an extended transmission facility or a digital sorter or store, for specific examples. In the case of an extended transmission facility, duplicate stepping counters such as that shown at 104 in FIGURE 3 may be provided at the two terminals. Depending on the type of error rate determination circuit which is employed, switching control signals must be sent from the decoding terminal to the encoding terminal or vice versa. In the case of indirect parameters, such as those discussed in the preceding paragraph, the signals may be sent over the data link. When the error rate signals are detected directly as shown in FIGURE 4, however, signals for advancing the switching control counter or stepping it back must be transmitted from the decoder to the encoder on a coded and time-shared basis, or otherwise, depending on traffic and other engineering factors. When the data link is a digital sorter or store, however, the direct switching control connections shown in the present drawings are practical and may be employed.

Additional background material which may well be mentioned for the sake of completeness at this point include a copending application Serial No. 693,452 of W. D. Lewis and myself entitled "Multiple Error Correction Circuitry," filed October 30, 1957 now Patent 2,954,433, granted September 27, 1960. The error correction scheme disclosed in that application is eminently suitable for inclusion in the present compound error handling system. In this regard, it may be particularly noted that both correctable and uncorrectable error circuits are provided. Concerning the logic circuit components, such as AND circuits, OR circuits, and the like, reference is made to an early article by J. H. Felker entitled "Regenerative Amplifier for Digital Computer Applications," which appeared at pages 1584 through 1596 of the November 1952 issue of the Proceedings of the Institute of Radio Engineers, Volume 40, Number 11. The circuits of the present invention may be implemented in accordance with the technology disclosed in the Felker article, or in accordance with any of the many other systems of logic building blocks which have been disclosed in texts and articles on this subject which appeared in the last ten years.

It is to be understood that the above-described arrangements are illustrative of the application of the principles of the invention. Numerous other arrangements may be devised by those skilled in the art without departing from the spirit and scope of the invention.

What is claimed is:

1. A digital data system comprising a source of input digital signals, compound single pass encoding circuitry including means for transmitting signals in accordance with different digital coding schemes of different redundancies, compound decoding circuitry including means for decoding signals encoded by said encoding circuitry, a digital data link interconnecting said encoding and said decoding circuitry, means for generating signals indicating the rate of occurrence of errors on said data link, and means responsive to said error rate signals for automatically switching said encoding and decoding circuitry from one of said different digital coding schemes to another.

2. In a digital data system, a source of input digital signals, a compound encoder for adding check digits to the input digital signals, said encoder including means for transmitting signals in accordance with different digital encoding schemes providing different error correcting capacities and having different redundancies, a corresponding compound decoder for correcting errors in the transmitted signals and means for automatically switching from one of said schemes to another.

3. In a digital data system, a source of input digital signals, a compound encoder including means for transmitting signals in accordance with different digital encoding schemes providing different error correcting capacities and different redundancies, means for generating signals indicating the rate of occurrence of correctable and uncorrectable errors for the one of said schemes currently in use, and means for automatically switching from one of said schemes to another in response to said error rate signals.

4. A digital data system comprising a source of input digital signals, compound encoding circuitry including means for transmitting signals in accordance with different digital coding schemes of different redundancies, buffer storage circuit means connected between said source and said encoding circuitry for transmitting input signals to said encoding circuitry in accordance with timing signals supplied by said encoding circuitry, compound decoding circuitry including means for decoding signals encoded by said encoding circuitry, a digital data link interconnecting said encoding and said decoding circuitry, means for generating signals indicating the rate of occurrence of errors on said data link during the processing of random input digital signals, and means responsive to said error rate signals for automatically switching said encoding and decoding circuitry from one coding scheme to another.

5. In a digital data system, a source of input digital signals, a compound encoder for adding check digits to the input digital signals, said encoder including means for transmitting signals in accordance with different digital coding methods providing different error correcting capacities, and means for automatically switching from one of said digital coding methods to another of said digital coding methods.

6. In a digital data system, a source of input digital signals, a compound encoder for adding check digits to the input digital signals, said encoder including means for transmitting signals in accordance with different digital coding schemes providing different error correcting capacities and having different redundancies, means for generating signals indicating the rate of occurrence of correctable errors for the scheme currently in use, means for generating signals representing the rate of occurrence of uncorrectable errors for the scheme currently in use, and means for switching from one of said schemes to another in response to both of said two types of error rate signals.

7. In a digital data system, a source of input digital signals, a buffer storage circuit connected to receive signals from said source, a compound encoder connected to said buffer storage circuit for adding check digits to the input digital signals and for supplying timing control signals to said buffer storage circuit, said encoder including means for transmiting signals in accordance with different digital coding schemes providing different error detecting capacities, and means for automatically switching from one of said schemes to another and concurrently changing the rate at which timing signals are applied to said buffer storage circuit.

8. In a digital data system, a source of input digital signals, a compound encoder for increasing the redundancy of the input digital signals, said encoder including means for transmitting signals in accordance with different digital coding schemes providing different error detecting capacities and different redundancies, means for counting errors for the scheme currently in use during the processing of random input digital signals, means for periodically sensing the output of said counting means and for resetting said counting means, and means for automatically switching from one of said schemes to another in response to the sensed output of said error counting means.

9. In combination, a source of digital input information, a buffer storage circuit coupled to said source, a digital data handling system, a compound encoding circuit including a simple parity check error detection encoder and a single pass parity check error correction encoder, and means for selectively and automatically switching either said simple parity check encoder or said error correction encoder into circuit between said buffer storage circuit and said data handling system.

10. In combination, a source of digital input information, a buffer storage circuit coupled to said source, a digital data link, a compound encoding circuit including a simple parity check error detection encoder and a single pass parity check error correction encoder, means for generating error rate signals, and means for selectively and automatically switching either said simple parity check encoder or said error correction encoder into circuit between said buffer storage circuit and said data link in accordance with said error rate signals.

11. In combination, a data system, means for providing said system with an error detection scheme, means for providing said system with a single pass parity check type error correction scheme of higher redundancy than said error detection scheme, means responsive to high error rate conditions for automatically switching from said error detection scheme to said error correction scheme, and means responsive to low error rate conditions for switching from said error correction scheme to said error detection scheme.

12. In combination, means for handling digital information in accordance with different digital encoding schemes having different error detection and correction capabilities, first and second error rate circuits, means for applying signals representing correctable errors for the scheme currently in use to said first error rate circuit, means for applying signals representing uncorrectable errors to said second error rate circuit, and means for switching from one of said schemes to another when either of the error rates exceeds predetermined toleration limits.

13. In combination, means for handling digital information in accordance with different digital coding schemes having different error detection and correction capabilities, first and second error rate circuits, means for applying signals representing correctable errors to said first error rate circuit, means for detecting uncorrectable errors for each scheme, and means for weighting the detected signals representing uncorrectable errors to provide signals approximating the number of uncorrectable received digits, means for applying the weighted signals to said second error rate circuit, and means for switching from one of said schemes to another in accordance with control signals developed from said error rate circuits.

14. In combination, a data processing system, means for providing said system with an error detection scheme, means for providing said system with at least one error correction scheme by which information is processed at higher redundancies and with a different digital code than with said error detection scheme, means for determining the rate of occurrence of uncorrectable errors with the scheme in use at any time, means for determining the rate of occurrence of correctable errors, if any, with the scheme in use at any time, and means for shifting from one of said schemes to another in response to the determined error rates.

15. In combination, means for processing digital information in accordance with different digital coding schemes having different error detection and correction capabilities, first and second error rate circuits, means for applying signals representing correctable errors for the scheme currently in use to said first error rate circuit, means for applying signals representing uncorrectable errors to said second error rate circuit, means for switching from one of said schemes to another when either of the error rate exceeds predetermined toleration limits, and inhibiting means for preventing the operation of said switching means to a more powerful error correction scheme when the correctable error rate is below a predetermined level.

16. In combination, means for processing digital information in accordance with different digital coding schemes having different error detection and correction capabilities, means for generating an error rate signal in accordance with correctable errors only, and means for switching from one of said schemes to another in accordance with the magnitude of said error rate signal.

17. In a digital data system:

a source of input digital signals;

a compound encoder, said encoder including first means for transmitting signals in accordance with a first digital coding method providing one level of error correcting redundancy and also including additional means for transmitting signals in accordance with a second different digital coding method providing a different level of error correcting redundancy;

a corresponding compound decoder including means for decoding signals coded in accordance with said first method and additional means for decoding signals coded in accordance with said second method;

a digital data link interconnecting said encoder and said decoder;

means for generating signals indicating uncorrectable errors for the one of said encoding methods in use; and switching means responsive to said error indication means for concurrently switching said encoder and said decoder from one of said coding methods to another of said coding methods.

References Cited in the file of this patent

UNITED STATES PATENTS

| | | |
|---|---|---|
| Re. 23,601 | Hamming et al. | Dec. 23, 1952 |
| 2,340,809 | Hatton et al. | Feb. 1, 1944 |
| 2,724,739 | Harris | Nov. 22, 1955 |
| 2,802,199 | Albrighton et al. | Aug. 6, 1957 |
| 2,813,149 | Cory | Nov. 12, 1957 |
| 2,972,127 | Lukoff et al. | Feb. 14, 1961 |
| 2,983,789 | Henning | May 9, 1961 |

FOREIGN PATENTS

| | | |
|---|---|---|
| 211,165 | Australia | Oct. 24, 1957 |